Oct. 31, 1939.　　　　M. KATCHER　　　　2,178,206
STEERING KNUCKLE JOINT
Filed Feb. 2, 1938
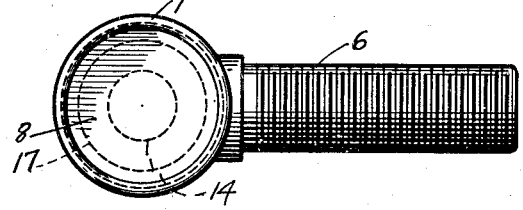
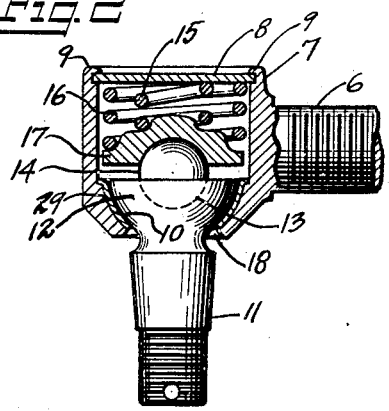
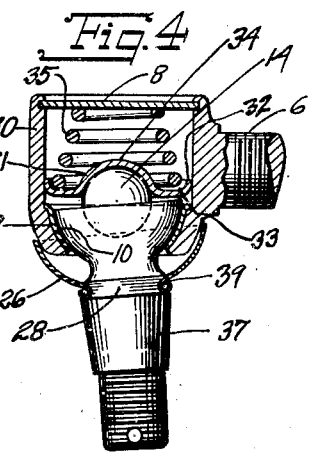
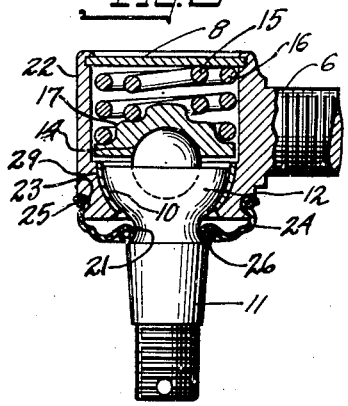
INVENTOR
*Morris Katcher*
BY
*Emanuel Scheyer*
ATTORNEY Patented Oct. 31, 1939

2,178,206

UNITED STATES PATENT OFFICE 2,178,206

STEERING KNUCKLE JOINT

Morris Katcher, New York, N. Y.

Application February 2, 1938, Serial No. 188,222

3 Claims. (Cl. 287—90)

This invention relates to a steering knuckle joint providing limited universality of movement and is particularly adapted for use in the tie rod and drag link connections for the steering mechanism of automotive vehicles.

It is an object of this invention to provide a joint which is automatically self-adjusting to compensate for wear of the engaging parts, and in which the parts are so shaped and frictionally held to each other that lost motion and rattling is effectively prevented.

It is a further object of the present invention to provide a bushing of anti-friction metal between certain of the parts where there is sliding between them, obviating the necessity and consequent expense of hardening one or both of the parts where in contact. It is also well known that parts lose their toughness where hardened. On the other hand if the parts are soft at said contact there is the tendency of their freezing. A single steel ball is used to transmit the spring pressure to the stud. It is a further object to provide novel dust exclusion means.

Other objects and advantages will become apparent upon further study of the description and drawing in which—

Fig. 1 is a top view of the device.

Fig. 2 is a transverse section of same.

Fig. 3 is a transverse section taken similarly to Fig. 2, but with another modified form of dust exclusion seal, and Fig. 4 is a transverse section of a modified form having a stamped sheet metal socket cap and a spring metal dust exclusion cap.

Threaded shank 6 is provided with a hollow boss or housing 7 at its end, Figs. 1 and 2. The upper end of housing 7 is closed by means of a circular plate 8 set in a groove near said end, the upper edges of the housing being peened over at 9 to retain said plate. The lower end of housing 7 on the inside is concaved to present a surface 29 in the form of a spherical zone. Nesting in said lower end is a bushing 10 whose inner and outer surfaces are also in the form of spherical zones. Said bushing is made of anti-friction metal such as phosphor-bronze. Stud 11 is provided with a head 12 whose side surface is in the form of a spherical zone fitting inside of bushing 10. The top of head 12 is flat except for a substantially hemispherical depression or socket 13. The center of the sphere, of which depression 13 is a segment, is in axial alignment with the longitudinal axis of stud 11. Mounted in socket 13 is a ball bearing 14. Compression springs 15 and 16 press socket cap 17 down on ball bearing 14, the upper ends of said springs reacting against the bottom of plate 8. Cap 17 is of forged or cast metal. The opening 18 at the lower end of housing 7 is sufficiently large to permit a limited amount of swinging of stud 11 about the center of ball bearing 14 as a pivotal axis. The pressure of springs 15 and 16 produces a certain desirable amount of friction between head 12 and the inside of bushing 10 which prevents rattling and lost motion. Further said pressure moves the parts together to take up for wear.

The modification shown in Fig. 3 is similar to the knuckle of Figs. 1 and 2 except that housing 22 is formed with an outside groove 23 near its lower end. A dust exclusion cap 24 of flexible material, such as rubber or leather is fastened at its upper end over a ring of wire 25 which hugs housing 22 in groove 23. The lower end of cap 24 is fastened over a ring of wire 26 which hugs stud 11 in groove 21. There is enough slack in cap 24 to accommodate the swinging of stud 11 relatively to housing 22. Cap 24 prevents dust from entering the interior of housing 22.

The modification shown in Fig. 4 has a cap 26 made of a springy material, such as spring steel, and is beaded at its lower end over a ring of wire 39 which hugs stud 37 in groove 28. The lower end of housing 30 on the outside has a surface in the form of a spherical zone. The center of the sphere of which said zone is a part is substantially the center of ball bearing 14. Cap 26 has its upper end forced into position against housing 30 at said zone. The upper edge of the cap being forced down against the resilience of the cap, there is always a spring pressure between the edge of the cap and the housing. The curvature of said zone and the inside of cap 26 are eccentric, so that the upper end of said cap is all that ever contacts said zone, for all positions of stud 37. In Fig. 4, stud 37 is shown in tilted position. The edge contact of the upper end of cap 26 with said zone readily adjusts itself to vibration because of the springy nature of the cap. In such dust exclusion caps of the prior art, the cap is concentric with the zone, so that the full pressure from any vibration is transmitted to the cap which in time will enlarge the cap and permit dirt to enter. Further, where the cap is concentric and slides over the zone, dirt will work in because there cannot be a very tight fit and there is no compensation for wear as in my cap.

Another feature wherein the knuckle of Fig. 4 differs from that of the other figures is that socket cap 31 is a steel stamping having a peripheral flange 32 which gives rise to an annular channel 33 between said flange and the dome shaped portion 34. The lower end of compression spring 35 sets in channel 33.

I claim:

1. A joint comprising a housing having an internal bearing surface near one end in the form of a spherical zone, a stud extending into the housing through an aperture at said end, said stud having a head in said housing, said head having the surface of its side in the form of a spherical zone in a bearing fit with the internal bearing surfact of the housing, the end of said head facing away from said aperture having a recess therein, a ball bearing having bearing engagement at one side in said recess, a socket cap having a socket therein in bearing engagement with the opposite side of the ball bearing, and spring means urging said socket cap against the ball bearing, the center of the ball bearing being substantially at the center of the sphere of which the spherical internal bearing surface of the housing is a part, said recess and said socket each having a spherical bearing surface for the ball bearing of substantially the same radius as that of the ball, and each being deep relatively to said radius.

2. A joint comprising a housing having an internal bearing surface near one end in the form of a spherical zone, a stud extending into the housing through an aperture at said end, said stud having a head in said housing, said head having the surface of its side in the form of a spherical zone in a bearing fit with the internal bearing surface of the housing, the end of said head facing away from said aperture having a recess therein, a ball bearing having bearing engagement at one side in said recess, a socket cap having a socket therein in bearing engagement with the opposite side of the ball bearing, the side edges of said cap being clear of the inside of the housing, and spring means urging said socket cap against the ball bearing, the center of the ball bearing being substantially at the center of the sphere of which the spherical internal bearing surface of the housing is a part, said recess and said socket each having a spherical bearing surface for the ball bearing concentric with the surface of the ball, and each being deep relatively to the radius of the ball bearing.

3. A joint comprising an apertured housing, an inner substantially spherical surface surrounding said aperture, a headed stud extending through the aperture of said housing, a washer like member of a material different from that of the head of the stud interposed between said stud and said housing to reduce friction therebetween, said member being of substantially spherical formation and fixedly engaging the spherical surface of the housing, and means constantly urging said stud bearing surface into bearing relationship with said member.

MORRIS KATCHER.